United States Patent [19]

Barron

[11] Patent Number: 4,557,446

[45] Date of Patent: Dec. 10, 1985

[54] CABLE RETENTION CLIP

[76] Inventor: Earl L. Barron, P.O. Box 10356, Houston, Tex. 77206

[21] Appl. No.: 433,156

[22] Filed: Dec. 2, 1982

[51] Int. Cl.⁴ .............................................. F16L 3/00
[52] U.S. Cl. ................................... 248/65; 248/231.9
[58] Field of Search ..................... 248/65, 74 A, 74 R, 248/73, 243, 244, 245, 59, 222.2, 231.8, 231.9, 231.1, 297.2

[56] References Cited

U.S. PATENT DOCUMENTS

| | | | |
|---|---|---|---|
| 2,053,262 | 9/1936 | Cornell | 248/65 |
| 3,228,640 | 1/1966 | Wolsh | 248/74 A |
| 3,299,839 | 1/1967 | Nordbak | 248/243 |
| 3,409,257 | 11/1968 | Elm | 248/65 |
| 3,437,743 | 4/1969 | Lindsey | 248/65 |
| 3,491,971 | 1/1970 | Fisher | 248/65 |
| 3,521,332 | 7/1970 | Kramer | 248/74 R |
| 3,888,440 | 6/1975 | Rebentisch | 248/73 |

Primary Examiner—Ramon S. Britts
Assistant Examiner—Ramon O. Ramirez
Attorney, Agent, or Firm—Neal J. Mosely

[57] ABSTRACT

A novel cable retention system is disclosed for a vertically-extending, channel-shaped wall rack member with a plurality of vertically spaced retaining T-slots therein, and a cable hanger having a T-shaped end portion with a neck portion fitting the base portion of one of the T-slots to retain the same in place and on which an underground cable is secured. A resilient, flexible-plastic, retaining clip is wedged between the T-shaped end-portion of the cable hanger and the upper edge of the T-slot in which it is positioned to secure the cable hanger against accidental dislodgment. The clip comprises a formed resilient flexible piece of plastic having an indentation along its top surface with a low ridge along one edge thereof and a higher wall along the other edge fitting on opposite sides of the upper edge of the T-slot in which it is positioned.

4 Claims, 9 Drawing Figures

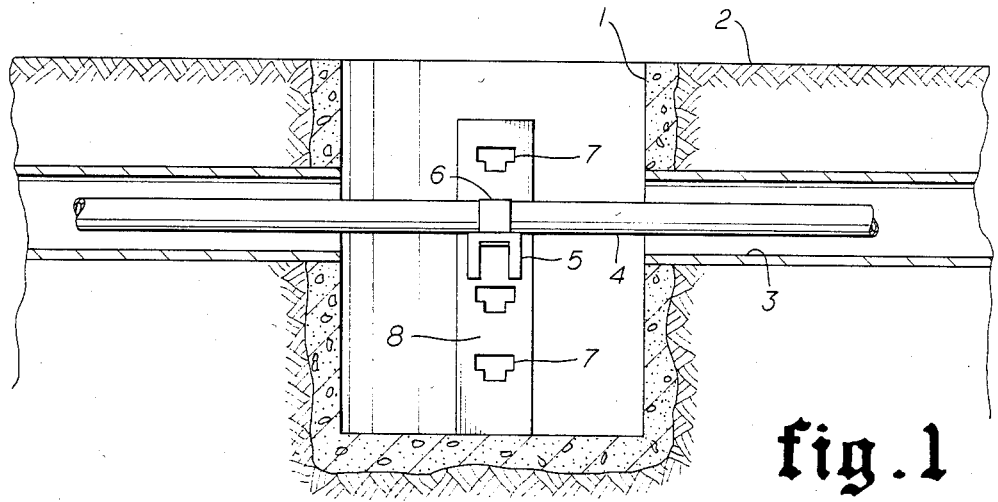
fig.1 (PRIOR ART)
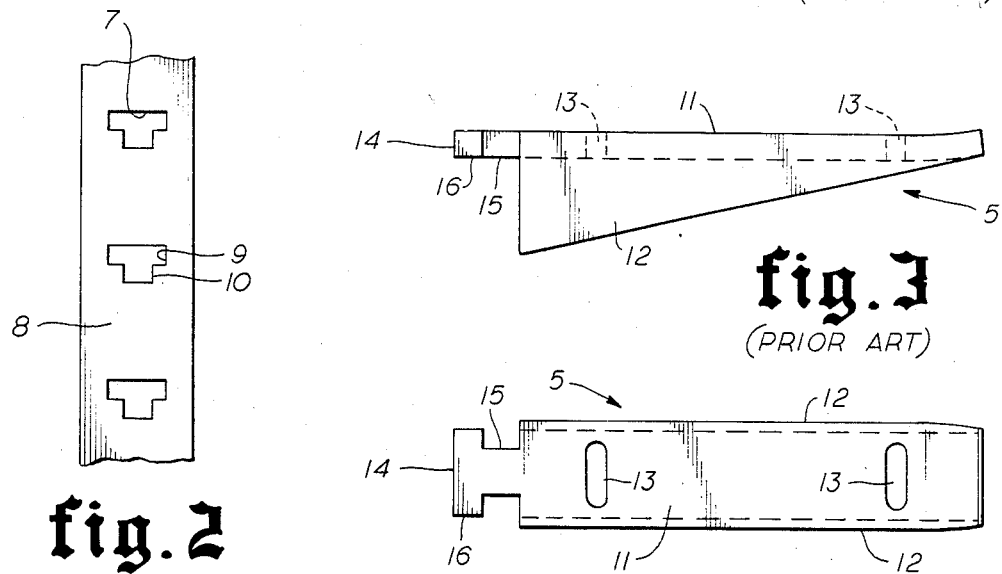
fig.2 (PRIOR ART)
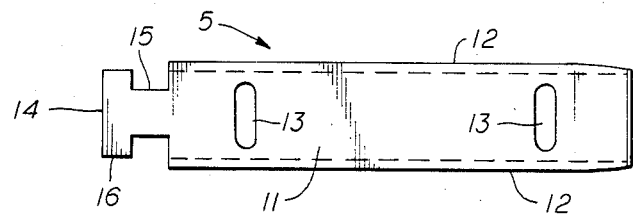
fig.3 (PRIOR ART)
fig.4 (PRIOR ART)
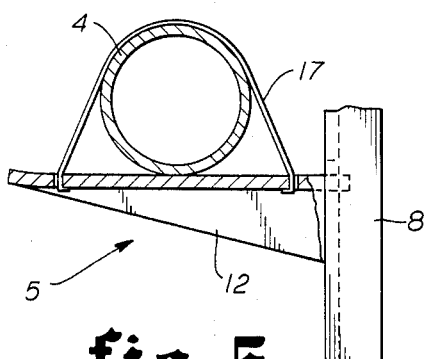
fig.5 (PRIOR ART)
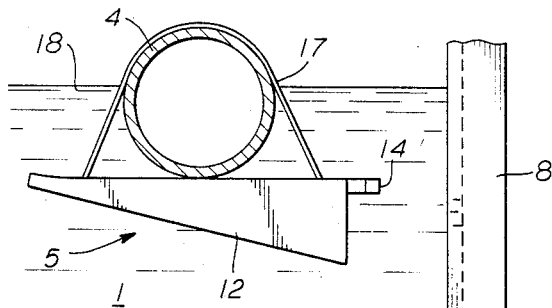
fig.6 (PRIOR ART)

CABLE RETENTION CLIP

SUMMARY OF THE INVENTION

The Snap Loc Clip is a flexible plastic clip shaped to form a ridge and locking retention device to secure cable support hangers to wall racks. The ridge is formed to fit under the wall slot and then is stopped by the back wall of the clip. The clip retains the cable hanger support in place until it is to be removed.

BRIEF DESCRIPTION OF THE DRAWINGS

FIG. 1 is a partial vertical section through a man hole showing the prior art connection of telephone cables to the cable support hanger on a wall rack therein.

FIG. 2 is a fragmentary view, in elevation, of a wall rack supporting channel as shown in FIG. 1.

FIG. 3 is a side elevation of a prior art cable support hanger as shown in FIG. 1.

FIG. 4 is a top plan view of the prior art cable support hanger shown in FIG. 3.

FIG. 5 is a view in side elevation of the cable support hanger positioned in a wall rack, as shown in FIG. 1, with a cable lashed thereon.

FIG. 6 is a view in side elevation of the cable support hanger rack shown in FIG. 5, with a cable lashed thereon, which has floated out of the wall rack as a result of water in the man hole.

DESCRIPTION OF THE PREFERRED EMBODIMENT

Figure 7:
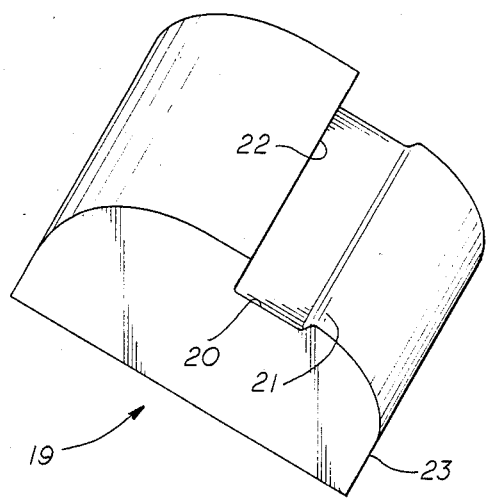
FIG. 7 is an isometric view of a resilient clip, comprising a preferred embodiment of this invention, used for securing the cable hangers in the wall rack.

Referring to the drawing by numerals of reference, FIGS. 1–6 show the prior art installation of telephone cables and the manner of securing them on a wall rack in a cable man hole. In FIG. 1, there is a vertical section through the earth through a man hole and underground cable passageway. In FIG. 1, man hole 1 extends into the ground form the surface 2 and intersects cable passageway 3. A cable 4 extends from passageway 3 into man hole 1 and is secured to cable hanger 5 by strap 6. Cable hanger 5 is supported in one of the T-slots 7 in a vertically extending wall rack 8.

In FIG. 2, it is seen that wall rack 8 is a vertically extending channel member with a plurality of T-slots 7 therein for receiving and supporting cable hanger 5. Each of the T-slots 7 has a wide portion 9 and a narrow base or stem portion 10. In FIGS. 3 and 4, it is seen that cable hanger 5 is channel shaped in cross section, having a top wall 11 and depending side walls 12. Top wall 11 has a pair of slots 13 which provide for securing a cable in place by means of a strap. Top wall 11 has a T-shaped extension 14 for securing the cable hanger 5 in the T-slots 7 of wall rack 8. Extension 14 has a narrow neck portion 15, of a size fitting into the base portion 10 of T-slot 7, and a retaining T-portion 16 which is large than base portion 10 but smaller than wide portion 9 of T-slot 7.

When the cable hanger 5 is installed in place, the neck portion 15 fits in the base portion 10 with T-portion 16 being positioned inside the wall rack channel 8 to secure the hanger. Telephone cable 4 is shown secured on cable hanger 5 by strap 17. In FIG. 6, the man hole 1 has filled with water as indicated at 18. The cable 4 has sufficient buoyancy to float and cable hanger has drifted out of the retaining T-slot 7. The entire construction described to this point is standard telephone company procedure and has been in use for many years.

Figure 8:
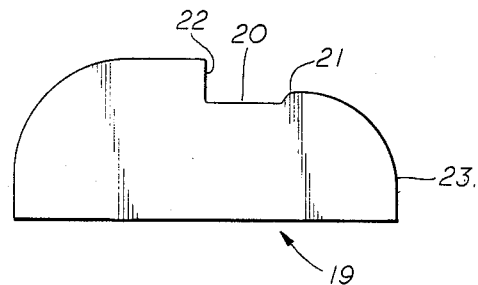
FIG. 8 is a view in end elevation of the clip shown in FIG. 7.
Figure 9:
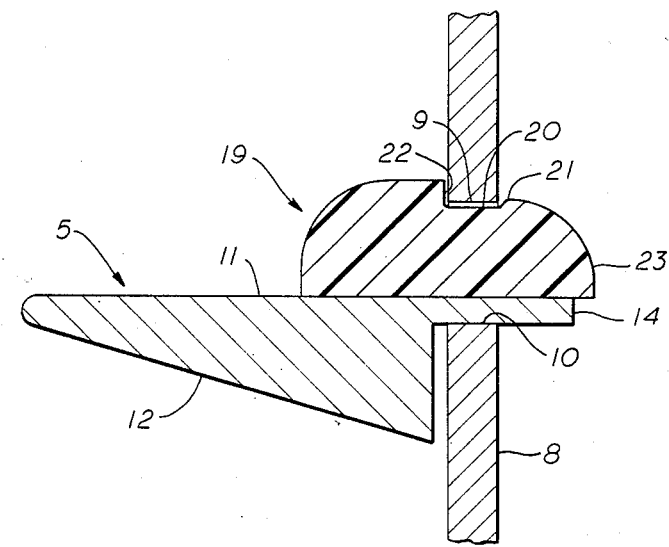
FIG. 9 is a vertical section through the wall rack and cable hanger showing the clip of FIGS. 7 and 8 installed in place.

FIGS. 8 and 9, there is shown a clip 19 for use in securing the cable hanger 5 against dislodging from the T-slot 7. Clip 19 is made of a resilient flexible plastic material. Clip 19 has an indentation 20 having a ridge 21 on one side and a retaining wall 22 on the other side. When the cable hanger 5 is in place, with the neck portion 15 fitting in the base portion 10 of T-slot 7, clip 19 is wedged into place between the top surface of top wall 11 and the wide portion 9 of the T-slot. Clip 19 has its end 23 pushed into the wide portion 9 of T-slot 7 until the ridge 21 snaps through and is secured in place with ridge 21 on one side and wall 22 on the other side of the upper edge of T-slot 7. This locks the cable hanger 5 in place and prevents it from floating out of the slot when water fills the man hole. Of course, if it becomes necessary to move the cable hanger 5, the clip 19 can be pulled out manually or by pliers or other instrument.

What is claimed is:

1. The combination with a cable retention system having a vertically-extending, channel-shaped wall rack member with a plurality of vertically spaced retaining T-slots therein, a cable hanger having a T-shaped end portion with a neck portion fitting the base portion of one of said T-slots to retain the same in place, of a resilient, flexible plastic retaining clip wedged between said T-shaped end portion of said cable hanger and the upper edge of the T-slot in which it is positioned to secure said cable hanger against accidental dislodgment, said clip comprising a formed resilient flexible piece of plastic having an indentation along its top surface with a low ridge along one edge thereof and a higher wall along the other edge fitting on opposite sides of the upper edge of the T-slot in which it is positioned.

2. A combination as defined in claim 1 in which said clip comprises a formed resilient flexible piece of plastic having one side of greater thickness and the other side of lesser thickness, and said one side and said other side being curved along the upper outer edges thereof.

3. A resilient, flexible-plastic retaining clip for use in a supporting structure for telephone cable comprising a vertically-extending, channel-shaped wall rack member with a plurality of vertically spaced retaining T-slots therein, a cable hanger having a T-shaped end portion with a neck portion fitting the base portion of one of said T-slots to retain the same in place, said clip being adapted to be wedged between the T-shaped end portion of a cable hanger and the upper edge of the T-slot in which it is positioned to secure said cable hanger against accidental dislodgment, said clip comprising a formed resilient flexible piece of plastic having an indentation along its top surface with a low ridge along one edge thereof and a higher wall along the other edge adapted to fit on opposite sides of the upper edge of the T-slot in which it is to be positioned.

4. A retaining clip as defined in claim 3 comprising a formed resilient flexible piece of plastic having one side of greater thickness and the other side of lesser thickness and an indentation along its top surface therebetween defining a low ridge along one edge of said indentation and a higher wall along the other edge adapted to fit on opposite sides of the upper edge of the T-slot in which it is to be positioned, and said one side and said other side being curved along the upper outer edges thereof.

* * * * *